Figure 1:
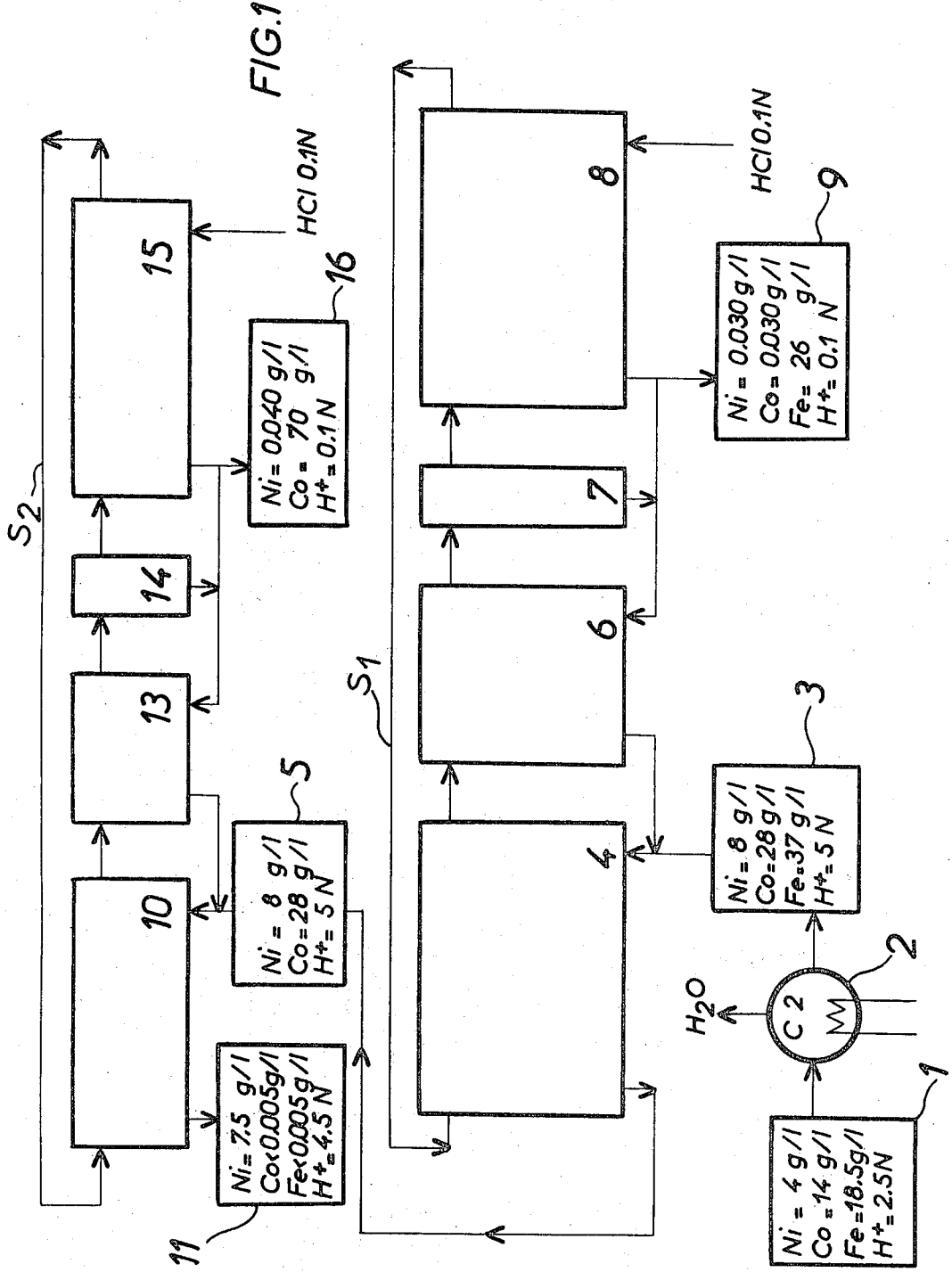

United States Patent [19]
Gandon et al.

[11] 3,871,978
[45] Mar. 18, 1975

[54] PROCESS FOR THE PRODUCTION OF HIGH-PURITY METALS FROM NICKELIFEROUS MATTES

[75] Inventors: Louis Gandon, Rambouillet; Robert Lemarinel, Elancourt, both of France

[73] Assignee: "Le Nickel", Paris Cedex, France

[22] Filed: Nov. 28, 1973

[21] Appl. No.: 419,533

[30] Foreign Application Priority Data
Dec. 1, 1972 France .......................... 72.42776

[52] U.S. Cl............ 204/113, 75/101 BE, 75/101 R, 75/119, 423/139
[51] Int. Cl..................... C22d 1/14, C22b 23/04, C22b/1/08
[58] Field of Search............ 75/101 BE, 101 R, 119; 204/113; 423/139

[56] References Cited
UNITED STATES PATENTS

| | | | |
|---|---|---|---|
| 3,380,801 | 4/1968 | Williams et al................. | 75/101 BE |
| 3,399,055 | 8/1968 | Ritcey et al.......................... | 75/119 |
| 3,540,860 | 11/1970 | Cochran ......................... | 75/101 BE |
| 3,660,026 | 5/1972 | Michel et al.......................... | 75/119 |
| 3,661,564 | 5/1972 | Gandon et al................. | 75/101 BE |
| 3,718,458 | 2/1973 | Ritcey et al..................... | 75/101 BE |
| 3,752,745 | 8/1973 | Kane et al............................ | 75/119 |

Primary Examiner—R. L. Andrews
Attorney, Agent, or Firm—Fleit & Jacobson

[57] ABSTRACT

In a method for producing high-purity nickel from impure nickel matte containing cobalt and other impurities including communiting and roasting the impure matte; dissolving the resulting impure nickel oxide in concentrated hydrochloric acid; oxidizing the iron in the resulting solution to the ferric state, removing the impurities from the solution by means of ion-exchange resin to produce a purified nickel chloride solution and selectively eluting the impurities to recover a cobalt chloride solution; and subjecting the purified nickel chloride solution to an electrolysis to recover high-purity nickel, the improvement in which the ion-exchange resin containing the impurities is eluted by means of approximately decinormal hydrochloric acid, the eluate is concentrated and then placed in contact consecutively with a first organic solvent to extract iron and a second organic solvent to extract cobalt, the first organic solvent is washed, decanted and then subjected to iron re-extraction, and the second organic extraction is washed, decanted and then subjected to cobalt re-extraction.

11 Claims, 2 Drawing Figures

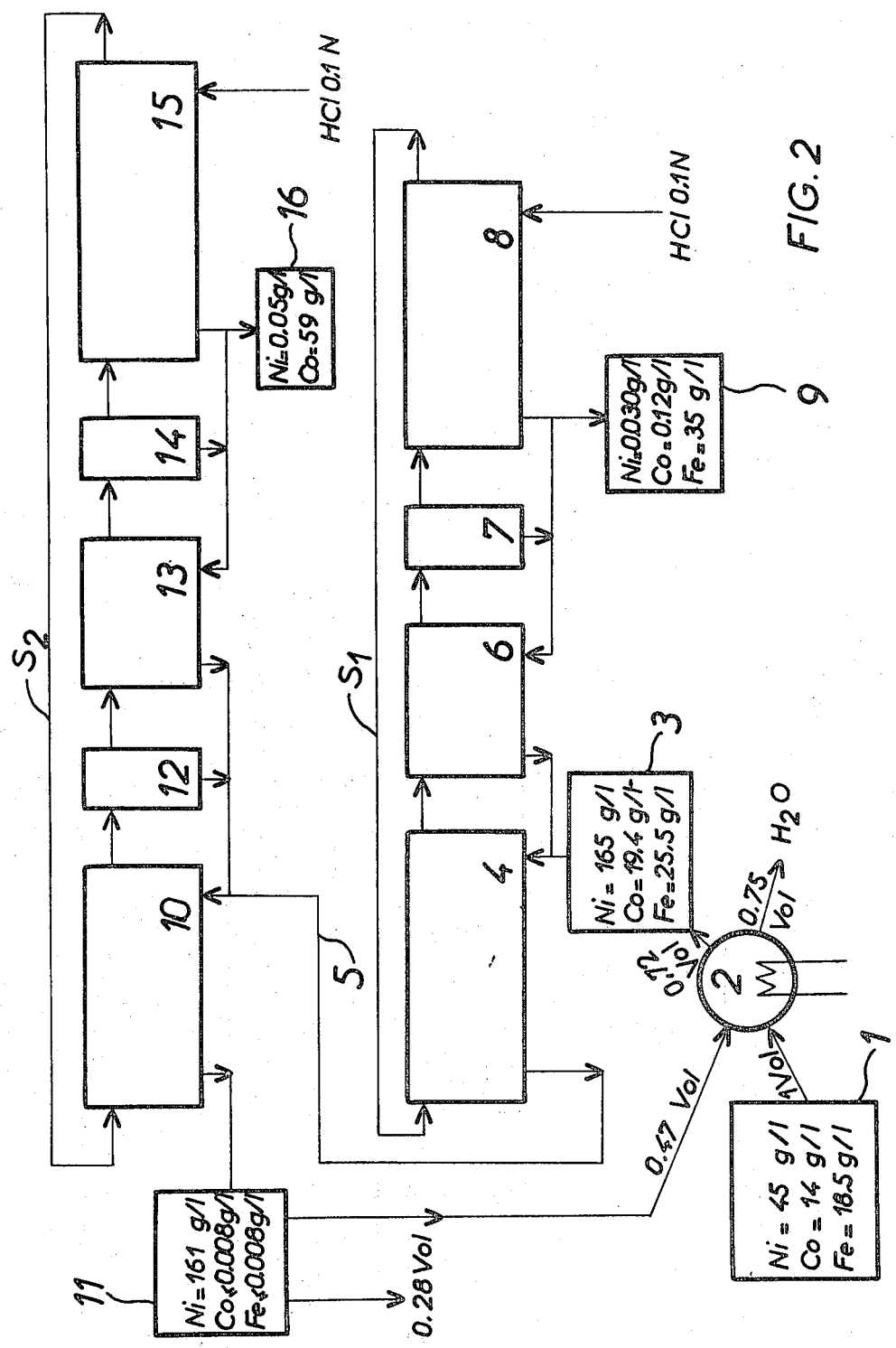

PROCESS FOR THE PRODUCTION OF HIGH-PURITY METALS FROM NICKELIFEROUS MATTES

This invention concerns the production of nickel and by-product metals.

A process is described in our British Patent Application No. 24,283/72 for the production of high-purity nickel, that is to say having a degree of purity exceeding 99.95%, from nickeliferous mattes. This process comprises the following steps: (a) comminuting said matte, roasting said matte at a temperature of approximately 900°C to obtain nickel oxide; (b) dissolving this impure nickel oxide in concentrated hydrochloric acid; (c) oxidizing to the ferric state the iron which is contained in the impure solution resulting from the preceding step; (d) removing the impurities from this solution by means of an ion-exchange resin and eluting said impurities to recover cobalt; and (e) subjecting the purified solution to an electrolysis to recover high-purity nickel.

The present invention relates to an improvement in this process and, more particularly, to the processing of the eluate obtained during stage (d) for elimination of the impurities by means of ion-exchange resins.

As stated in that Patent Application, this resin may be subjected to washing by means of approximately decinormal hydrochloric acid, if appropriate after rinsing with concentrated hydrochloric acid. The solution obtained during the washing, that is, the "eluate," contains the impurities which had adhered to the resin, and the present invention seeks to offer a process which renders it possible to recover and separate the metals of value such as nickel and cobalt which the eluate contains.

According to the present invention, there is provided a process according to claim 1 of Patent Application No. 24,283/72, wherein the ion-exchange resin containing said impurities is eluted by means of approximately decinormal hydrochloric acid, the eluate obtained being concentrated, and then placed in contact consecutively with a first organic solvent to extract iron and with a second organic solvent to extract cobalt, to produce a pure nickel chloride solution, the first organic solvent being washed, decanted and then subjected to an iron re-extraction operation, to produce a solution rich in iron, and the second organic solvent being washed, decanted and then subjected to a cobalt re-extraction operation to produce a purified cobalt chloride solution.

The first organic solvent preferably contains secondary lauryl amine, usually diluted in an appropriate reagent, for example the solvents sold under the Trade Marks Naphtha or Solvesso. The second organic solvent preferably contains tri-isooctylamine, which is normally diluted in an appropriate reagent.

The iron and cobalt re-extractions are each advantageously performed by placing the first and second organic solvents in contact with separate approximately decinormal hydrochloric acid.

Each of these washings is preferably performed by means of a part of the solution emerging from the corresponding re-extraction operation, to which is added to the aqueous phase issuing from the decanting operation following the washing operation. As for the aqueous phase emerging after the washing operation, this may be combined with the solution applied for the respective re-extraction operation. Finally, a complementary decanting operation may be performed, the resulting aqueous phase being recycled to the extracting of the cobalt, and possibly likewise for the nickel extracting.

As will be shown, it can be rendered possible to obtain a purified nickel chloride (low cobalt) solution at the outlet from a cobalt extraction operation, and a purified cobalt chloride (low nickel) solution at the outlet of a cobalt re-extraction operation, very little cobalt being taken along during re-extraction of iron.

In a first embodiment of the invention, the ion-exchange resins are rinsed with (possibly concentrated) hydrochloric acid before being subjected to the said washing which produces the initial solution for the process corresponding to the present invention.

In another embodiment, this rinsing operation is omitted and, in this case, a part of the purified nickel chloride solution produced is combined with the initial eluate, prior to concentrating, in order to increase its complexing capacity.

The invention will now be described, purely by way of example, with reference to the accompanying drawings, wherein:

FIG. 1 is a diagram of the principal processing stages corresponding to Example 1 according to the invention; and FIG. 2 is similar to FIG. 1, but corresponds to Example II according to the invention.

The compositions of the various solutions playing a part during the process have been specified in these figures, but are purely exemplary. Moreover, the operations and solutions which are identical or perform the same function have been marked by the same references in both figures.

The initial solution to be processed according to the present invention is obtained as specified in Patent Application No. 24,283/72 by washing out, preferably with approximately decinormal hydrochloric acid, an ion-exchange resin column through which an impure nickel chloride solution is passed to purify the solution.

In the case of Example 1, given below, the actual washing of the ion-exchange resin is preceded by a rinsing of the resin by means of concentrated hydrochloric acid. By contrast, in the case of Example II, this rinsing is omitted, which results in the entrainment of a greater quantity of nickel during the washing, so that the proportion of nickel in the eluate is distinctly greater.

EXAMPLE I (ILLUSTRATED BY FIG. 1)

The initial solution 1 (the eluate) to be processed has the following composition:

| | | |
|---|---|---|
| Ni | : | 4 grammes/litre |
| Co | : | 14 grammes/litre |
| Fe | : | 18.5 grammes/litre |
| H+ | : | 2.5 moles/litre |

This solution is first subjected to a concentrating action 2, which removes half its initial volume of water. A concentrated solution 3 is thus obtained, wherein the elements are of course present in double the concentrations of the solution 1, that is, 8 grammes/litre of nickel, 28 grammes/litre of cobalt, 37 grammes/litre of iron, and 5 moles/litre of H+ ion.

The concentrated (aqueous) solution 3 is then placed in counterflow contact 4 with a first organic solvent $S_1$, in this case secondary lauryl amine diluted in Naphtha solvent to a concentration of 0.6 mol per litre. Contact is established in four stages, with 2.8 volumes of the organic phase to each volume of the aqueous phase.

This counterflow contact 4 has the purpose to extract the iron contained in the concentrated solution 3 and may be performed in any conventional mixer decanter plant. After separation of the organic phase, an aqueous solution 5 results, denuded of iron and containing 8 grammes/litre of nickel and 28 grammes/litre of cobalt. As these concentrations are the same as of the solution 3, only negligible nickel or cobalt can have been drawn along in the organic phase.

The organic phase is then washed in a single stage 6, thereafter being led into a decanter 7 and thereafter being placed in counterflow contact 8 with an approximately decinormal hydrochloric acid solution. This contact 8 is performed in four stages with two volumes of organic phase to each volume of hydrochloric acid, to re-extract the iron contained in the solvent $S_1$; a solution 9 results, containing 26 grammes/litre of iron. Allowing for the different volume ratios of organic and aqueous phases, this corresponds to the entire iron present within the concentrated solution 3. Moreover, the solution 9 contains no more than 0.030 grammes/litre of nickel and 0.030 grammes/litre of cobalt, again proving that these elements are but negligibly entrained during the iron-extraction counterflow contact 4.

A part of the ferric solution 9 is used for the washing stage 6, which is performed with 100 volumes of organic phase per volume of aqueous phase, so that the fraction of the solution 9 requisitioned for this purpose is extremely small, the more so since the aqueous phase emerging from the decanter 7 is also added to the aqueous washing solution. After the washing stage 6, this aqueous washing solution is recycled to joint the concentrated solution 3 immediately before the counterflow contact 4. The organic phase emerging from the iron re-extraction contact 8 is recycled continuously and directly into the iron extraction contact 4.

The solution 5 stripped of iron undergoes further processing, comparable to that described, but this time in order to denude it of cobalt. The solvent $S_2$ employed for this purpose is dilute tri-iso-octylamine, in the proportion of 0.6 mol per litre of solvent, the solvent being a mixture of 97% by volume of Naphta and 3% octylol.

This further processing includes a contact stage 10 with the solvent $S_2$. This stage 10 is performed in five steps, with 4 volumes of the organic phase per volume of aqueous phase, and yields a rather pure nickel chloride solution 11 containing 7.5 grammes/litre of nickel and less than 0.005 grammes/litre of each of the elements cobalt and iron.

After the solvent $S_2$ has extracted the cobalt from the solution 5, the solvent $S_2$ is washed in two stages 13, and is then led into a decanter 14 and is finally placed in contact 15 with an approximately decinormal hydrochloric acid solution in order to re-extract the cobalt it contains. This re-extraction contact 15 is performed in six stages with 10 volumes of the organic phase per volume of aqueous phase.

The solvent $S_2$ is thus obtained denuded of cobalt on the one hand, and is recycled into the extraction stage 10, and on the other hand a cobaltiferous solution 16 is obtained containing 70 grammes/litre of cobalt and no more than 0.040 grammes/litre of nickel, which demonstrates that the nickel undergoes practically no entrainment during the re-extraction contact 15.

A small proportion of the solution 16, with which is combined all the aqueous phase emerging from the decanter 14, is used for the washing 13, which is performed with 100 volumes of organic phase per volume of aqueous phase. After the washing 13, the aqueous phase is recycled to the solution 5 immediately before the extraction stage 10.

Thus, three practically pure solutions 9, 11 and 16 are obtained, 9 being of iron chloride, 11 of nickel chloride, and 16 of cobalt chloride, so that the objects of the invention are accomplished by means of this process. It should be noted moreover that the $H^+$ ion concentration of these solutions amounts, respectively, to 0.1, 4.5 and 0.1 moles per litre.

EXAMPLE II (ILLUSTRATED BY FIG. 2)

A solution 1 to be process contains 45 grammes/litre of nickel, 14 grammes/litre of cobalt and 18.5 grammes/litre of iron and was obtained directly by washing out, without rinsing, an ion-exchange resin column charged with impurities.

This solution 1 is subjected to a concentrating operation 2, to produce a concentrated solution 3 having the following composition:

| Ni | : | 165 | grammes/litre |
|----|---|-----|---------------|
| Co | : | 19.4 | grammes/litre |
| Fe | : | 25.5 | grammes/litre |

This composition is not a mere multiple of the composition of the solution 1, because the concentrating operation 2 was performed with addition of a pure nickeliferous solution, as will be explained.

The concentrated solution 3 is initially subjected to iron extraction 4 by means of an organic solvent $S_1$ identical to the $S_1$ of Example 1. A solution 5 stripped of iron is thus obtained, from which the cobalt is then extracted at 10 by means of a solvent $S_2$ identical to the $S_2$ of Example 1. A pure nickel chloride solution 11 is then obtained, containing 161 grammes/litre of nickel and less than 0.008 grammes/litre of each of the elements cobalt and iron.

After iron extraction 4, the solvent $S_1$ is washed at 6, decanted at 7 and subjected to an operation 8 for re-extraction of iron by means of approximately decinormal hydrochloric acid. After separation from the organic phase, the aqueous phase 9 from the iron re-extraction 8 contains 35 grammes/litre of iron, 0.030 grammes/litre of nickel and 0.12 grammes/litre of cobalt.

The solvent $S_2$, following the cobalt extraction operation 10, is in turn decanted at 12, washed at 13, given a second decanting 14 and finally subjected to a cobalt re-extraction operation 15 making use of decinormal hydrochloric acid. The (organic) phase emerging from this last operation 15 is a solution 16 of cobalt chloride which is substantially pure and contains 59 grammes/litre of cobalt, and no more than 0.05 grammes/litre of nickel.

The recycling of the different solutions is performed as in Example 1, with the difference that the aqueous phase issuing from the complementary decanter 12 which is absent in Example 1, is combined with the solution 5 stripped of iron.

Moreover, a proportion of the nickel chloride solution 11 is recycled to the concentrating operation 2 in order to enrich the solution 3 with chloride, thus increasing its complexing ability. The rates of flow of the solutions and the concentrating action are controlled so that for each volume of solution 1 entering the concentrating plant, 0.47 volume of the solution 11 also enters, 0.75 volume of water is removed and 0.72 volume of concentrated solution 3 emerges.

In the same period, 0.28 volume of solution 11 becomes available for application outside the process.

For each organic/aqueous extraction stage of the process, the following table lists the number of steps applied and the ratio (O/A) between the volume of the organic phase and that of the aqueous phase in contact therewith:

| Stage | | No. of steps | O/A |
|---|---|---|---|
| iron extraction | 4 | 4 | 4 |
| washing | 6 | 1 | 100 |
| iron re-extraction | 8 | 4 | 4.7 |
| cobalt extraction | 10 | 4 | 5 |
| washing | 13 | 2 | 200 |
| cobalt re-extraction | 15 | 6 | 14 |

Accordingly, it is apparent that even if the eluate solution 1 to be processed is obtained without preliminary rinsing, it is possible by partial recycling of the pure nickel chloride solution 11 to obtain substantially pure nickel chloride and cobalt chloride solutions separately, without losing appreciable quantities of either metal.

The solvents $S_1$ and $S_2$ could clearly consist of products other than those specified, it being sufficient that they allow of selective extraction of iron for $S_1$ and of cobalt for $S_2$.

What we claim is:

1. In a method for producing high-purity nickel from pure nickel matte containing cobalt and other impurities comprising successively the following steps: (a) communiting and roasting said impure matte at a temperature of about 900°C to obtain impure nickel oxide; (b) dissolving this impure nickel oxide in concentrated hydrochloric acid; (c) oxidizing to the ferric state the iron which is contained in the impure solution resulting from the preceding step; (d) removing the impurities from this solution by means of ion-exchange resin to produce a purified nickel chloride solution and selectively eluting said impurities to recover a cobalt chloride solution; and (e) subjecting the purified nickel chloride solution to an electrolysis to recover high-purity nickel; the improvement according to which said ion-exchange resin containing said impurities is eluted by means of approximately decinormal hydrochloric acid, the eluate obtained is concentrated and then placed in contact consecutively with a first organic solvent to extract iron and a second organic solvent to extract cobalt to produce a pure nickel chloride solution, the first organic solvent is washed, decanted and then subjected to an iron re-extraction operation to produce a solution rich in iron, and the second organic solvent is washed, decanted and then subjected to a cobalt re-extraction operation to produce a purified cobalt chloride solution.

2. A method as claimed in claim 1 wherein said iron re-extraction operation comprises contacting the first organic solvent with approximately decinormal hydrochloric acid.

3. A method as claimed in claim 1, wherein said cobalt re-extraction operation comprises contacting the second organic solvent with approximately decinormal hydrochloric acid.

4. A method as claimed in claim 1, wherein a part of the said solution rich in iron is combined with the aqueous phase issuing from the decanting of the first organic solvent, the combination being used for the washing of the first organic solvent.

5. A method as claimed in claim 1, wherein a part of the said purified cobalt chloride solution is combined with the aqueous phase issuing from the decanting of the second organic solvent, the combination being used for the washing of the second organic solvent.

6. A method as claimed in claim 1, wherein one or both of the aqueous solutions issuing from washing the first and second organic solvents are recycled to the extracting performed by the respective organic solvent.

7. A method as claimed in claim 1, wherein the first organic solvent contains secondary lauryl amine.

8. A method as claimed in claim 1, wherein the second organic solvent contains tri-iso-octyl amine.

9. A method as claimed in claim 1, wherein the said ion-exchange resin is subjected, prior to the elution thereof, to a rinsing action by means of approximately decinormal hydrochloric acid.

10. A method as claimed in claim 1, wherein no rinsing action is performed on the said ion-exchange resin prior to the elution thereof, and wherein a part of said purified nickel chloride solution is added to the eluate prior to concentrating the latter.

11. A method as claimed in claim 10, further comprising a complementary decanting operation performed between contacting the second organic solvent with the concentrated eluate and washing the second organic solvent, the aqueous phase resulting from this complementary decanting operation being recycled to the extracting of cobalt.

* * * * *